(No Model.)
3 Sheets—Sheet 1.
J. WENMAEKERS.
COMBINED AQUARIUM AND MARITIME THEATER.
No. 324,508. Patented Aug. 18, 1885.
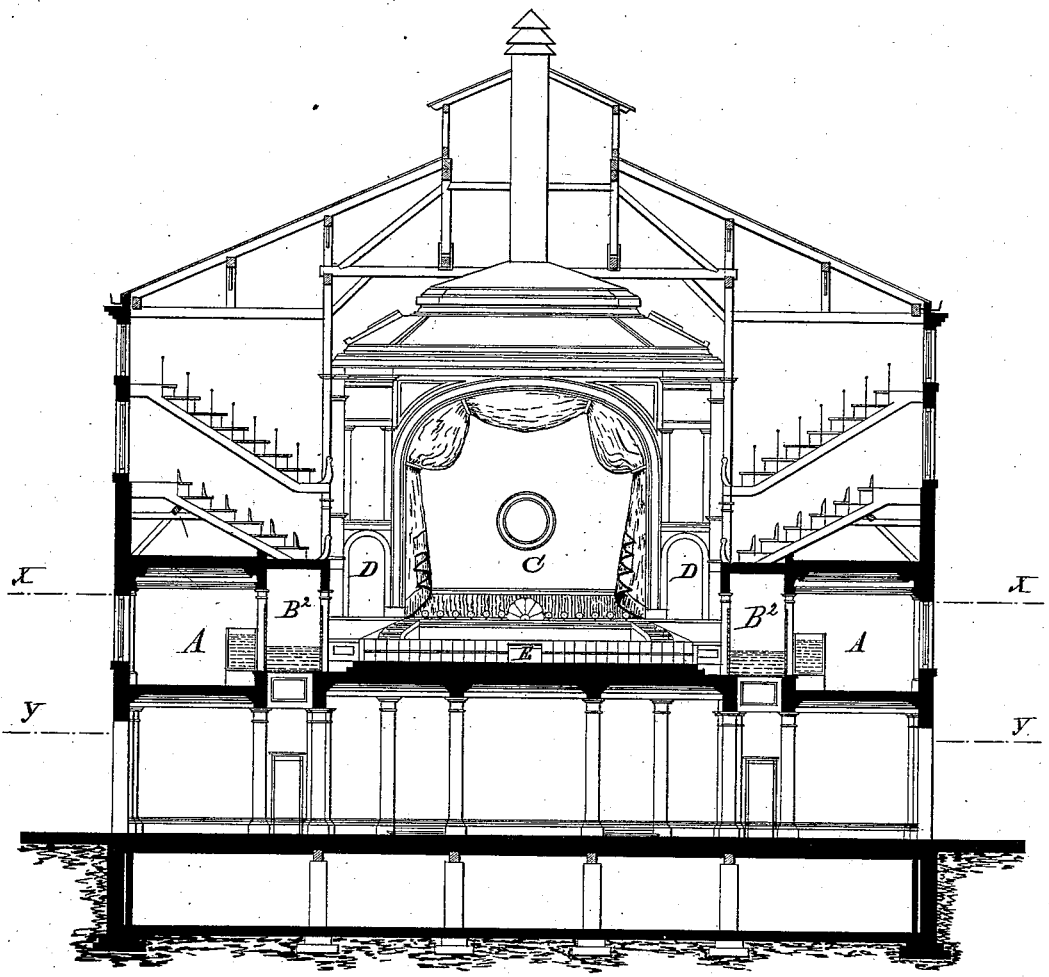
WITNESSES:
A. Schehl
Otto Risch
INVENTOR.
Jerome Wenmaekers
BY Paul Goepel
ATTORNEY (No Model.) 3 Sheets—Sheet 2.
J. WENMAEKERS.
COMBINED AQUARIUM AND MARITIME THEATER.
No. 324,508. Patented Aug. 18, 1885.
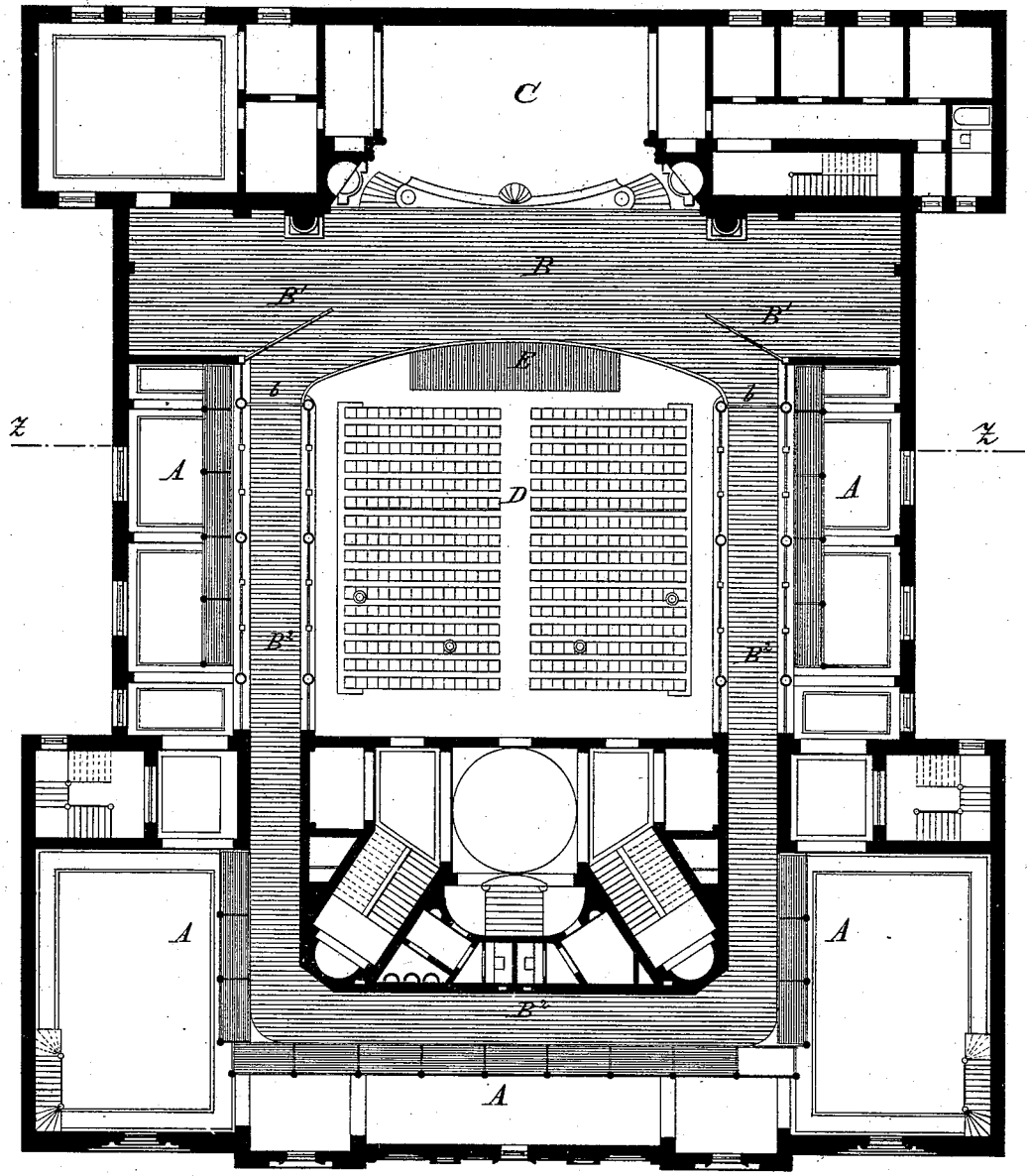

(No Model.) 3 Sheets—Sheet 3.
J. WENMAEKERS.
COMBINED AQUARIUM AND MARITIME THEATER.
No. 324,508. Patented Aug. 18, 1885.
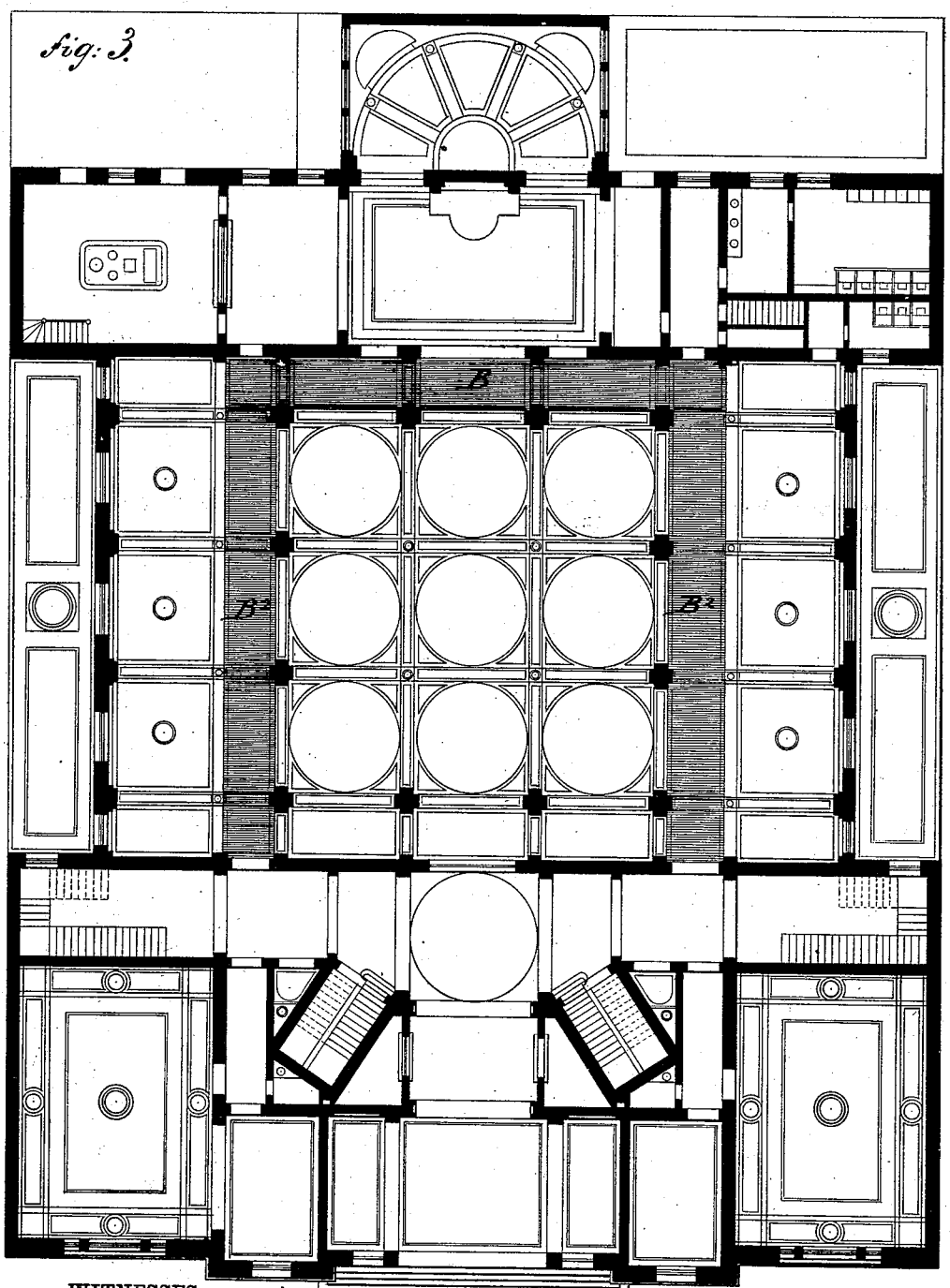
WITNESSES:
A. Schehl
Otto Risch
INVENTOR
Jerome Wenmaekers
BY Paul Goepel
ATTORNEY

United States Patent Office.

JEROME WENMAEKERS, OF ANTWERP, BELGIUM, ASSIGNOR TO HIMSELF AND PAUL GOEPEL, OF NEW YORK, N. Y.

COMBINED AQUARIUM AND MARITIME THEATER.

SPECIFICATION forming part of Letters Patent No. 324,508, dated August 18, 1885.

Application filed March 31, 1883. (No model.)

*To all whom it may concern:*

Be it known that I, JEROME WENMAEKERS, of Antwerp, in the Kingdom of Belgium, have invented certain new and useful Improvements in Combined Aquariums and Maritime Theaters, of which the following is a specification.

This invention has reference to a novel place of amusement that is intended to combine the useful and instructive features of an aquarium with the entertaining features of a maritime theater, in which historical and nautical plays may be performed; and the invention consists of a combined aquarium and maritime theater in which is arranged a maritime stage in front of a permanent stage and between it and the auditorium, said maritime stage being formed by a tank of sufficient depth and width, the ends of which are connected by a U-shaped channel that extends below the galleries. The maritime stage is supplied with water from the different tanks of the aquarium-tanks, and separated by partition-walls from the latter. The bottom of the water-tank and connecting-channel is made in part of transparent glass panels, which form the ceiling for the story below, so that the fish in the tank and connecting channel can be observed from below.

In the accompanying drawings, which fully illustrate my invention, Figure 1 represents a vertical transverse section through my improved aquarium and maritime theater on line $z\ z$, Fig. 2; and Figs. 2 and 3 are horizontal sections of the same, respectively, on lines $x\ x$ and $y\ y$, Fig. 1.

Similar letters of reference indicate corresponding parts.

In my combined aquarium and theater the first story is preferably devoted to purposes of refreshment, and contains, besides the vestibule and halls, a large room used for a restaurant, kitchen, winter garden, and other accessories. The second and third floors are used for the theater, the aquarium proper being located on the second floor, where a number of tanks, A A, are arranged, which receive direct light through the windows of the building during the day, so that the fish and other objects of interest can be readily observed in the tanks.

The tanks are supplied with salt-water in any suitable manner, which water is then discharged into a large tank, B, that extends across the full width of the building, and that is located intermediately between a permanent stage, C, and the auditorium D.

A proper space, E, for the orchestra is arranged close to the tank B, which is provided with inclined wings B′ in front of the proscenium, said wings extending into the tank B and serving to hide the corners of the tank from view.

A U-shaped connecting-channel, B², extends below the galleries and immediately adjoining the series of aquarium-tanks A, from one side to the other side of the tank B, as shown clearly in Fig. 2, the channel being closed by partitions at both sides, so that it cannot be seen from the orchestra-seats and galleries nor from the rooms in which the aquarium-tanks are located.

The tank B in front of the stage C and its connecting-channel B² form a so-called "maritime stage," which serves the double purpose of a tank for the larger kinds of fish and as a water stage for displaying vessels of all kinds, so that nautical spectacular plays may be performed in connection with the permanent stage C.

The connecting-channel B² admits the vessels to pass from one side of the maritime stage B to the other side, as required for the purposes of the performance. The bottom of the tank B and of the connecting-channel B² is made of thick panels of glass, which are tightly secured against leakage, and which form at the same time the ceiling for the first story, so that persons sitting in the restaurant below can see the water and observe the fish in the tank, as the space above the same is sufficiently lighted up during the day and night. The proper pipe-connection between the aquarium-tanks and the main tank B and connecting-channel B² may be made in any approved manner.

To reduce the danger of accidents arising from leakage and flooding of the main tank B, the same can be shut off from the channel B² by hinged or sliding transverse partitions b b, which are also placed in position whenever the cleaning of the tank or channel is necessary.

The available space in the building not occupied by the aquarium-tanks A and stages B and C is utilized for the display of various scientific objects, so that the entire structure furnishes attractions for children and grown people, as it combines instruction with amusement.

Having thus described my invention, I claim as new and desire to secure by Letters Patent—

1. In a combined aquarium and maritime theater, the combination of a series of aquarium-tanks with a main tank or maritime stage arranged in front of a permanent stage, and with a connecting-channel, alongside of which the aquarium-tanks are arranged, substantially as set forth.

2. In a combined aquarium and maritime theater, the combination of a permanent stage with a main tank or maritime stage arranged between the permanent stage and the auditorium, substantially as set forth.

3. In a combined aquarium and maritime theater, the combination, with a permanent stage, of a maritime stage arranged between the permanent stage and the auditorium, and of a channel that connects one end of the maritime stage with the other, substantially as set forth.

4. In a combined aquarium and maritime theater, the combination of the permanent stage C, and maritime stage B, extending in front of the same, between it and the auditorium, said maritime stage having supplementary proscenium-wings B', substantially as described.

5. The combination, in a combined aquarium and maritime theater, of a permanent stage, C, with a maritime stage, B, in front of the same, between it and the auditorium, said maritime stage having supplementary proscenium-wings B' and a connecting-channel that extends below the galleries of the auditorium from one end of the maritime stage to the other, substantially as specified.

6. In a combined aquarium and maritime theater, the combination of the permanent stage C, a maritime stage, B, in front of the same, a connecting-channel, B², extending below the galleries of the auditorium from one end of the maritime stage to the other, the bottom part of the maritime stage and the connecting-channel being constructed of glass panels or plates that form the ceiling of the story below, substantially as and for the purpose specified.

In testimony that I claim the foregoing as my invention I have signed my name in presence of two subscribing witnesses.

JER. WENMAEKERS.

Witnesses:
W. WESTLAKE, Jr.,
THOS. W. NUGENT.